(12) United States Patent
Wada et al.

(10) Patent No.: US 7,109,623 B2
(45) Date of Patent: Sep. 19, 2006

(54) MOTOR AND ELECTRICALLY-DRIVEN FAN EMPLOYING THE SAME

(75) Inventors: Makoto Wada, Oita (JP); Akitomo Yamashita, Oita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/048,733

(22) Filed: Feb. 3, 2005

(65) Prior Publication Data

US 2005/0168088 A1 Aug. 4, 2005

(30) Foreign Application Priority Data

Feb. 4, 2004 (JP) ............................. 2004-027649

(51) Int. Cl.
*H02K 21/22* (2006.01)
*H02K 5/16* (2006.01)
*H02K 7/14* (2006.01)

(52) U.S. Cl. .......................... 310/156.45; 310/156.46; 360/98.07; 360/99.01

(58) Field of Classification Search ............. 310/67 R, 310/156.38, 156.43, 156.45, 156.46; 360/97.01, 360/98.01–98.08, 99.01–99.12
See application file for complete search history.

(56) References Cited

U.S. PATENT DOCUMENTS

| | | | | |
|---|---|---|---|---|
| 4,698,542 A | * | 10/1987 | Muller | 310/67 R |
| 6,181,035 B1 | * | 1/2001 | Acquaviva | 310/51 |
| 6,817,507 B1 | * | 11/2004 | Yeon | 226/188 |

FOREIGN PATENT DOCUMENTS

| | | |
|---|---|---|
| JP | 11150908 | 6/1999 |
| JP | 2002 112497 | 4/2002 |

* cited by examiner

*Primary Examiner*—Tran Nguyen
(74) *Attorney, Agent, or Firm*—Stevens, Davis, Miller & Mosher, LLP

(57) ABSTRACT

An electrically-driven fan 1 comprises a base portion 2; a bearing portion 11; a stator 13 including iron core portions 15 and coils 16; a rotor 4 including a rotary shaft 20 and a cylindrical magnet 22; blowing blades 5; and a rotor position detector 23 which is disposed on a side of the cylindrical magnet 22 near to the base portion 2, with a gap of predetermined width relative to the cylindrical magnet 22; wherein the cylindrical magnet 22 includes a thin-walled portion 24 in which an effective thickness of one end part thereof near to the rotor position detector 23 is made smaller than an effective thickness of the other end part thereof.

26 Claims, 6 Drawing Sheets

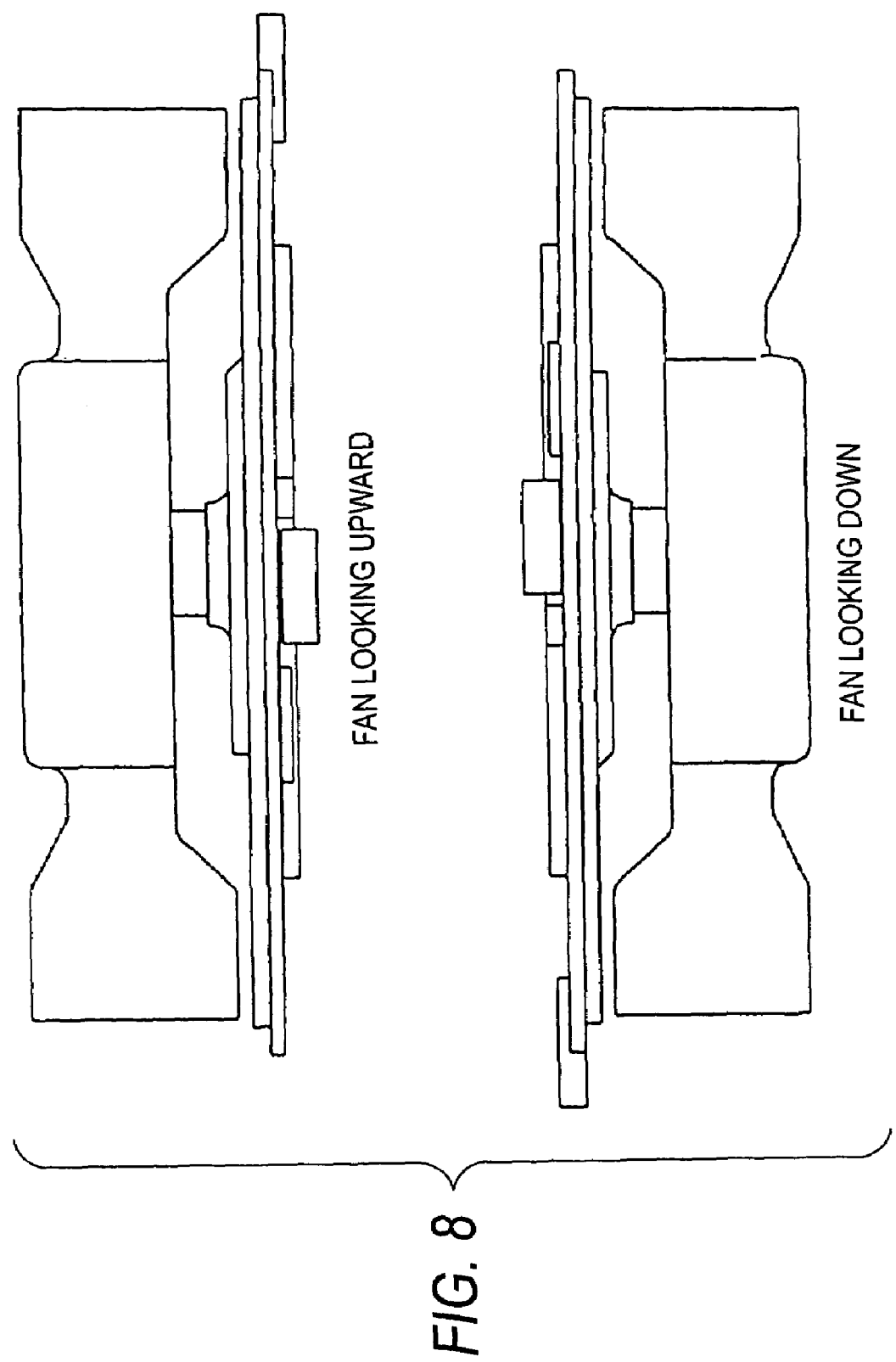

MOTOR AND ELECTRICALLY-DRIVEN FAN EMPLOYING THE SAME

BACKGROUND OF THE INVENTION

1. Field of the Invention

The present invention relates to an electrically-driven fan for forcibly cooling the CPU of a personal computer, or the like.

2. Description of the Related Art

In recent years, the higher performance of a personal computer (hereinbelow, termed "PC") has been attained. In consequence, the clock frequency of a CPU heightens to increase dissipation power and to increase the quantity of heat generation. The CPU whose temperature has risen due to the heat generation becomes unstable in the operations of transistors, and undergoes the drawbacks of failing to operate normally, etc. It is therefore necessary to forcibly cool the CPU and to release generated heat. A heat sink, a heat pipe or the like is usually used for the forcible cooling of the CPU, and further, an electrically-driven fan is extensively used with or without the heat sink, the heat pipe or the like. Some of such electrically-driven fans employ commutatorless DC motors in each of which a cylindrical magnet is employed for a rotor, and they are extensively used for such reasons as being capable of small size and thin structure and being easy of control. A "thin-structured electrically-driven fan" has been disclosed as the electrically-driven fan employing the commutatorless DC motor. Incidentally, the "thin-structured electrically-driven fan" employs a ball bearing as the bearing of a rotary shaft, but it sometimes employs a fluid bearing instead of the ball bearing. The fluid bearing is a bearing of noncontact type wherein V-shaped recesses are formed along the inner peripheral wall of a bearing hole, and oil is accumulated in the recesses, whereby the rotary shaft is floated and supported by the oil. The fluid bearing is capable of high-speed rotation owing to a very low friction, and it exhibits low rotation noise, so that it has been extensively used in recent years (refer to, for example, JP-A-11-150908 and JP-A-2002-112497).

On the other hand, the PC has been reduced in size in recent years, and especially in a notebook type PC or the like, various electronic components including the CPU are installed at a high density within a housing. Accordingly, an electrically-driven fan for cooling the CPU of such a PC has various limitations placed on its mounting position in order to realize a space-saving arrangement, and it is sometimes mounted looking down in such a way, for example, that it is fixed to a ceiling inside the housing. A vertical direction is a direction indicated in FIG. 8.

The prior-art techniques, however, have had problems as stated below.

(1) Usually, in order to attain enhancement in a coolability with a small space, the radiating blades of the rotor have been enlarged, or the number of the blades has been increased, with the result that the weight of the rotor has increased. The thin-structured electrically-driven fan has been problematic in the case where the electrically-driven fan is mounted looking down, as follows: When the weight of the rotor is large, the rotor moves vertically downwards due to its weight, and the position of the rotary shaft shifts downwards relative to the inner peripheral wall of the bearing hole, so that the abnormal touch between the rotary shaft and the inner peripheral wall of the bearing hole occurs to shorten the lifetime of the electrically-driven fan.

(2) Especially the thin-structured electrically-driven fan employing the fluid bearing has been problematic, as follows: The increase of the weight of the rotor results in a state where the position of the rotary shaft shifts downwards relative to the inner peripheral wall of the bearing hole, namely, a so-called state where the rotor rises, and the rotation of the rotor is not stabilized to incur the drawbacks that vertical vibrations occur during the rotation, and that the abnormal touch between the rotary shaft and the inner peripheral wall of the bearing hole occurs to generate noise.

(3) Besides, there has been the problem that, when the weight of the rotor is large, the position of the rotary shaft shifts downwards relative to the inner peripheral wall of the bearing hole, so the abnormal touch between the rotary shaft and the inner peripheral wall of the bearing hole occurs to shorten the lifetime of the electrically-driven fan. A sole measure for coping with this problem has heretofore been that the radiating blades are made small to lighten the rotor, or that the mounting position of the cylindrical magnet on the rotor is altered to mount the cylindrical magnet on a position distant from a rotor position detector such as Hall element. The measure has been problematic in that the enhancement of the coolability cannot be expected, or that the detection precision of the rotor position detector lowers.

SUMMARY OF THE INVENTION

The present invention solves the problems of the prior art, and has for its object to provide an electrically-driven fan in which, even when the fan is mounted and used looking down, a rotor does not move vertically downwards due to its weight, and a rotary shaft can be prevented from abnormally touching the inner peripheral wall of a bearing hole and then shortening a lifetime, so that blowing blades can be enlarged to enhance a coolability, and in which the lowering of a detection precision based on a rotor position detector can be suppressed on that occasion.

In order to solve the problems, the electrically-driven fan of the present invention consists in an electrically-driven fan comprising a base portion; a bearing portion which is erected on the base portion; a plurality of stators which include iron core portions, and coils that are wound on the individual iron core portions, and which are disposed around the bearing portion; a rotor which includes a rotary shaft that is journaled in the bearing portion, and a cylindrical magnet that is formed in a shape of a cylinder centering round the rotary shaft, that is disposed in opposition to outer peripheral parts of the stators, and that rotates integrally with the rotary shaft; blowing blades which are radially juxtaposed at an outer peripheral part of the rotor; and a rotor position detector which is disposed on a side of the cylindrical magnet near to the base portion, with a gap of predetermined width relative to the cylindrical magnet; the cylindrical magnet including a thin-walled portion in which an effective thickness of one end part thereof near to the rotor position detector is made smaller than an effective thickness of the other end part thereof.

Thus, it is possible to provide an electrically-driven fan in which, even when the fan is mounted and used looking down, a rotor does not move vertically downwards due to its weight, and a rotary shaft can be prevented from abnormally touching the inner peripheral wall of a bearing hole and then shortening a lifetime, so that blowing blades can be enlarged to enhance a coolability, and in which the lowering of a detection precision based on a rotor position detector can be suppressed on that occasion.

Besides, in order to solve the problems, the electrically-driven fan of the invention consists in an electrically-driven fan comprising a base portion; a bearing portion which is erected on the base portion; a plurality of stators which include iron core portions, and coils that are wound on the individual iron core portions, and which are disposed around the bearing portion; a rotor which includes a rotary shaft that is journaled in the bearing portion, and a cylindrical magnet that is formed in a shape of a cylinder centering round the rotary shaft, that is disposed in opposition to outer peripheral parts of the stators, and that rotates integrally with the rotary shaft; blowing blades which are radially juxtaposed at an outer peripheral part of the rotor; and a rotor position detector which is disposed on a side of the cylindrical magnet near to the base portion, with a gap of predetermined width relative to the cylindrical magnet; the cylindrical magnet being such that a width of a gap between an inwall of the cylindrical magnet at one end part thereof near to the rotor position detector and the outer peripheral part of the stator is made larger than a width of a gap between the inwall at the other end part and the outer peripheral part of the stator.

Thus, it is possible to provide an electrically-driven fan in which, even when the fan is mounted and used looking down, a rotor does not move vertically downwards due to its weight, and a rotary shaft can be prevented from abnormally touching the inner peripheral wall of a bearing hole and then shortening a lifetime, so that blowing blades can be enlarged to enhance a coolability, and in which the lowering of a detection precision based on a rotor position detector can be suppressed on that occasion.

As described above, according to the electrically-driven fan of the present invention, advantages as stated below are brought forth.

According to an aspect as defined in claim 1, (1) an attractive force by which each stator and a thin-walled portion draw each other magnetically becomes smaller as compared with an attractive force by which the stator and the other end part of a cylindrical magnet draw each other, and an attractive force by which a rotor is drawn toward the side of a base portion enlarges, so that even when an electrically-driven fan is mounted looking down, the rotor can be prevented from coming away from the base portion due to its weight. Thus, it is possible to provide an electrically-driven fan in which a rotary shaft can be prevented from abnormally touching the inner peripheral wall of a bearing hole and then shortening a lifetime or from giving forth noise, so that blowing blades can be enlarged to enhance a coolability.

(2) It is possible to provide an electrically-driven fan in which, since the thin-walled portion is formed merely by decreasing an effective thickness, the width of the gap between the cylindrical magnet and the rotor position detector does not enlarge, and the lowering of a detection precision based on the rotor position detector can be suppressed.

According to an aspect as defined in claim 2, it is possible to provide an electrically-driven fan in which, in addition to the advantages of claim 1, (1) even when the electrically-driven fan is mounted and used looking down, the rotor can be prevented from coming away from the base portion due to its weight, and the lowering of the detection precision based on the rotor position detector can be suppressed.

According to an aspect as defined in claim 3, (1) an attractive force by which each stator and one end part near to a rotor position detector draw each other magnetically becomes smaller as compared with an attractive force by which the stator and the other end part on the opposite side draw each other, and an attractive force by which a rotor is drawn toward the side of a base portion enlarges, so that even when an electrically-driven fan is mounted looking down, the rotor can be prevented from coming away from the base portion due to its weight. Thus, it is possible to provide an electrically-driven fan in which a rotary shaft can be prevented from abnormally touching the inner peripheral wall of a bearing hole and then shortening a lifetime or from giving forth noise, so that blowing blades can be enlarged to enhance a coolability.

(2) Since the width of the gap between one end part of a cylindrical magnet near to the rotor position detector and the outer peripheral part of each stator is merely made larger, it is possible to provide an electrically-driven fan in which the width of the gap between the cylindrical magnet and the rotor position detector does not enlarge, and the lowering of the detection precision based on the rotor position detector can be suppressed.

According to an aspect as defined in claim 4, it is possible to provide an electrically-driven fan in which, in addition to the advantages of claim 3, (1) even when the electrically-driven fan is mounted and used looking down, the rotor can be prevented from coming away from the base portion due to its weight, and the lowering of the detection precision based on the rotor position detector is preventable.

According to an aspect as defined in claim 5, it is possible to provide an electrically-driven fan in which, in addition to the advantages of any of claims 1 through 4, (1) the cylindrical magnet includes an annular lug, so that the width of the end part of the cylindrical magnet opposing to the rotor position detector can be enlarged to suppress the lowering of a detection precision.

According to an aspect as defined in claim 6, it is possible to provide an electrically-driven fan in which, in addition to the advantages of any of claims 1 through 5, (1) the end part of a yoke near to the rotor position detector includes an enlarged-diameter yoke portion which is expanded toward the outer peripheral side of the yoke, or a yoke cutout which is annularly provided in the inwall of the yoke, so that the cylindrical magnet can be easily fitted into the inner diameter side of the yoke to facilitate assemblage.

BRIEF DESCRIPTION OF THE DRAWINGS

FIG. 6(b) is a sectional view of an essential portion showing another example of the cylindrical magnet of the electrically-driven fan in this embodiment 2.

FIG. 8 is a diagram for defining the vertical direction of an electrically-driven fan.

DESCRIPTION OF THE PREFERRED EMBODIMENTS

Figure 1:
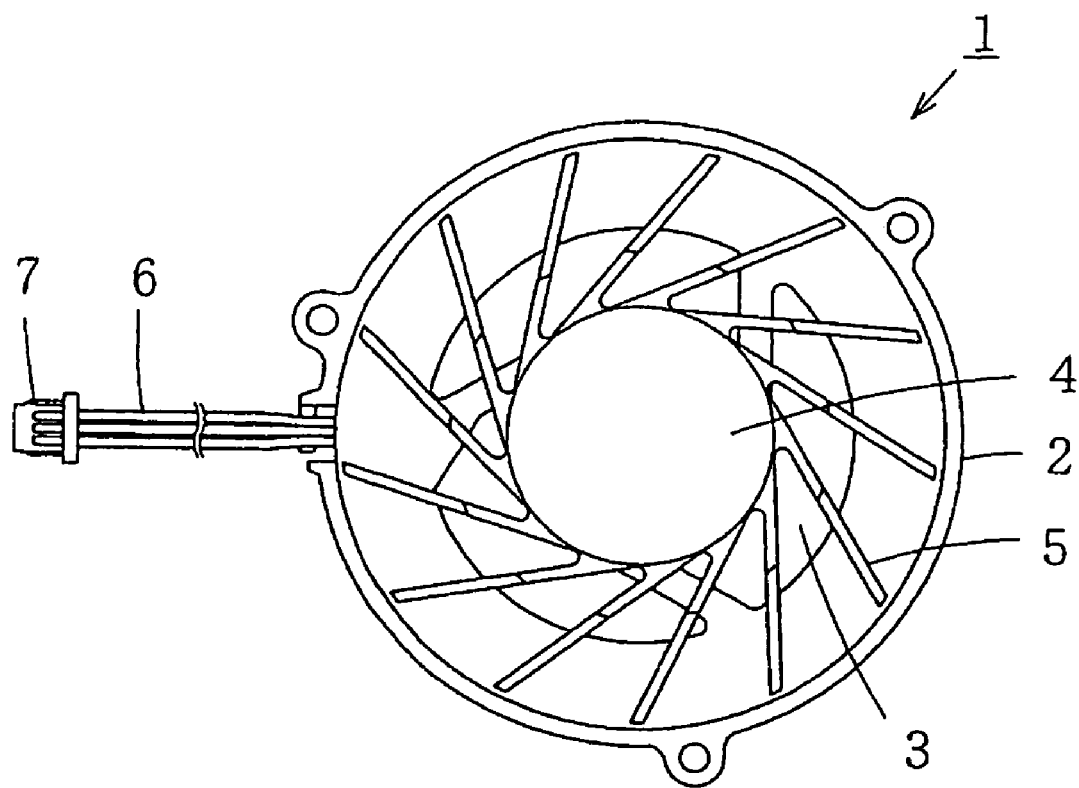
FIG. 1 is a plan view of essential portions showing a state where the casing of an electrically-driven fan in Embodiment 1 is detached.

The present invention has incarnated the object of providing an electrically-driven fan in which, even when the fan is mounted and used looking down, a rotor does not move vertically downwards due to its weight, and a rotary shaft can be prevented from abnormally touching the inner peripheral wall of a bearing hole and then shortening a lifetime, so that blowing blades can be enlarged to enhance a coolability, and in which the lowering of a detection precision based on a rotor position detector can be suppressed on that occasion; in such a way that the cylindrical magnet includes a thin-walled portion in which an effective thickness of one end part thereof near to the rotor position detector is made smaller than an effective thickness of the other end part thereof.

Besides, the invention has incarnated the object of providing an electrically-driven fan in which, even when the fan is mounted and used looking down, a rotor does not move vertically downwards due to its weight, and a rotary shaft can be prevented from abnormally touching the inner peripheral wall of a bearing hole and then shortening a lifetime, so that blowing blades can be enlarged to enhance a coolability, and in which the lowering of a detection precision based on a rotor position detector can be suppressed on that occasion; in such a way that a width of a gap between an inwall of the cylindrical magnet at one end part thereof near to the rotor position detector and the outer peripheral part of the stator is made larger than a width of a gap between the inwall at the other end part and the outer peripheral part of the stator.

The first aspect of performance of the invention made for solving the problems consists in an electrically-driven fan comprising a base portion; a bearing portion which is erected on the base portion; a plurality of stators which include iron core portions, and coils that are wound on the individual iron core portions, and which are disposed around the bearing portion; a rotor which includes a rotary shaft that is journaled in the bearing portion, and a cylindrical magnet that is formed in a shape of a cylinder centering round the rotary shaft, that is disposed in opposition to outer peripheral parts of the stators, and that rotates integrally with the rotary shaft; blowing blades which are radially juxtaposed at an outer peripheral part of the rotor; and a rotor position detector which is disposed on a side of the cylindrical magnet near to the base portion, with a gap of predetermined width relative to the cylindrical magnet; the cylindrical magnet including a thin-walled portion in which an effective thickness of one end part thereof near to the rotor position detector is made smaller than an effective thickness of the other end part thereof.

Owing to this construction, the following functions are attained:

(1) Since one end part of the cylindrical magnet near to the rotor position detector includes the thin-walled portion whose effective thickness is made smaller than the effective thickness of the other end part on the opposite side, an attractive force by which each stator and the thin-walled portion draw each other magnetically becomes smaller as compared with an attractive force by which the stator and the other end part draw each other, and an attractive force by which the rotor is drawn toward the side of the base portion enlarges, so that even when the electrically-driven fan is mounted looking down, the rotor can be prevented from coming away from the base portion due to its weight. Thus, the rotary shaft can be prevented from abnormally touching the inner peripheral wall of a bearing hole and then shortening a lifetime or from giving forth noise, so that the blowing blades can be enlarged to enhance a coolability.

(2) Since the thin-walled portion is formed merely by decreasing the effective thickness, the width of the gap between the cylindrical magnet and the rotor position detector does not enlarge, and the lowering of a detection precision based on the rotor position detector can be suppressed.

Here, the thin-walled portion may be formed either by cutting the inner peripheral wall side of the cylindrical magnet into the shape of an annular recess, or by cutting the outer peripheral wall side thereof into the shape of an annular recess.

Besides, the "effective thickness" is the thickness of the magnetized part of the cylindrical magnet. As the cylindrical magnet, it is also possible to employ one which includes a double-cylinder-shaped portion formed with a hollow part at the lower end part thereof. In this case, the "effective thickness" is the total thickness of the thicknesses of a cylinder on the inner peripheral side of the cylindrical magnet and a cylinder on the outer peripheral side thereof.

One or more Hall elements are employed as the rotor position detector.

The second aspect of performance of the invention made for solving the problems consists in the electrically-driven fan as defined in the first aspect of performance, in which the effective thickness of the thin-walled portion of the cylindrical magnet is made 50%–90% of the effective thickness of the other end part.

Owing to this construction, a function to be stated below is attained in addition to the functions of the first aspect of performance.

(1) Even when the electrically-driven fan is mounted and used looking down, the rotor can be prevented from coming away from the base portion due to its weight, and the lowering of the detection precision based on the rotor position detector can be suppressed.

Here, as the effective thickness of the thin-walled portion of the cylindrical magnet becomes smaller than 50% of the effective thickness of the other end part, unfavorably outputs based on the rotor position detector become smaller to lower the detection precision. On the other hand, as the effective thickness becomes larger than 90%, unfavorably the attractive force by which the rotor is drawn onto a side opposite to the base portion becomes larger, and hence, the rotor becomes easier to come away from the base portion due to its weight in the case where the electrically-driven fan is mounted and used looking down.

The third aspect of performance of the invention made for solving the problems consists in an electrically-driven fan comprising a base portion; a bearing portion which is erected on the base portion; a plurality of stators which include iron core portions, and coils that are wound on the individual iron core portions, and which are disposed around the bearing portion; a rotor which includes a rotary shaft that is journaled in the bearing portion, and a cylindrical magnet that is formed in a shape of a cylinder centering round the rotary shaft, that is disposed in opposition to outer peripheral parts of the stators, and that rotates integrally with the rotary shaft; blowing blades which are radially juxtaposed at an outer peripheral part of the rotor; and a rotor position detector which is disposed on a side of the cylindrical magnet near to the base portion, with a gap of predetermined width relative to the cylindrical magnet; the cylindrical magnet being such that a width of a gap between an inwall of the cylindrical magnet at one end part thereof near to the rotor position detector and the outer peripheral part of the stator is made larger than a width of a gap between the inwall at the other end part and the outer peripheral part of the stator.

Owing to this construction, the following functions are attained:

Since the width of the gap between the inwall of the cylindrical magnet at one end part thereof near to the rotor position detector and the outer peripheral part of each stator is made larger than the width of the gap between the inwall at the other end part and the outer peripheral part of the stator, an attractive force by which each stator and one end part near to the rotor position detector draw each other magnetically becomes smaller as compared with an attractive force by which the stator and the other end part on the opposite side draw each other, and an attractive force by which the rotor is drawn toward the side of the base portion enlarges, so that even when the electrically-driven fan is mounted looking down, the rotor can be prevented from coming away from the base portion due to its weight. Thus, the rotary shaft can be prevented from abnormally touching the inner peripheral wall of a bearing hole and then shortening a lifetime or from giving forth noise, so that the blowing blades can be enlarged to enhance a coolability.

(2) Since the width of the gap between one end part of the cylindrical magnet near to the rotor position detector and the outer peripheral part of each stator is merely made larger, the width of the gap between the cylindrical magnet and the rotor position detector does not enlarge, and the lowering of a detection precision based on the rotor position detector can be suppressed.

Here, an enlarged diameter portion is formed at one end part of the cylindrical magnet near to the rotor position detector, whereby the width of the gap between the stator and the outer peripheral part can be made larger than the width of the gap between the inwall at the other end part and the outer peripheral part of the stator, or an annular recess may well be formed in the inner peripheral wall of the cylindrical magnet at one end part thereof near to the rotor position detector.

The fourth aspect of performance of the invention made for solving the problems consists in the electrically-driven fan as defined in the third aspect of performance, in which the width of the gap between the inwall of the cylindrical magnet at one end part thereof near to the rotor position detector and the outer peripheral part of each stator is made 10%–30% larger than the width of the gap between the inwall at the other end part and the outer peripheral part of the stator.

Owing to this construction, a function to be stated below is attained in addition to the functions of the third aspect of performance.

(1) Even when the electrically-driven fan is mounted and used looking down, the rotor can be prevented from coming away from the base portion due to its weight, and the lowering of the detection precision based on the rotor position detector is preventable.

Here, as the width of the gap between the inwall of the cylindrical magnet at one end part thereof near to the rotor position detector and the outer peripheral part of each stator becomes larger than the width of the gap between the inwall at the other end part and the outer peripheral part of the stator, in an amount less than 10%, unfavorably an attractive force by which the rotor is drawn onto a side opposite to the base portion becomes larger, and hence, the rotor becomes easier to come away from the base portion due to its weight in a case where the electrically-driven fan is mounted and used looking down. As the width becomes larger in excess of 30%, unfavorably outputs based on the rotor position detector become smaller to lower a detection precision.

The fifth aspect of performance of the invention made for solving the problems consists in the electrically-driven fan as defined in any of the first through fourth aspects of performance, which includes an annular lug (lugs) which is (are) provided on the inwall and/or outer wall of the cylindrical magnet at the end part thereof near to the rotor position detector.

Owing to this construction, a function to be stated below is attained in addition to the function of any of the first through fourth aspects of performance.

(1) Since the cylindrical magnet includes the annular lug, the width of the end part of the cylindrical magnet opposing to the rotor position detector can be enlarged to suppress the lowering of a detection precision.

The sixth aspect of performance of the invention made for solving the problems consists in the electrically-driven fan as defined in any of the first through fifth aspects of performance, which includes a cylindrical yoke that is fitted outside the cylindrical magnet, and which includes an enlarged-diameter yoke portion expanded toward the outer peripheral side of the yoke, or a yoke cutout provided in the inwall of the yoke, at the end part of the yoke near to the rotor position detector.

Owing to this construction, functions to be stated below are attained in addition to the function of any of the first through fifth aspects of performance.

(1) Since the end part of the yoke near to the rotor position detector includes the enlarged-diameter yoke portion expanded toward the outer peripheral side of the yoke, or a yoke cutout annularly provided in the inwall of the yoke, the cylindrical magnet can be easily fitted into the inner diameter side of the yoke to facilitate assemblage.

(2) Even in the case where the lug is annularly provided on the outer wall of the cylindrical magnet, it can be received in the enlarged-diameter yoke portion or the yoke cutout.

Here, the yoke is fitted outside the outer peripheral side of the cylindrical magnet. Thus, the magnetic force of the cylindrical magnet can be amplified.

Embodiment 1

Now, an embodiment of the present invention will be described with reference to the drawings.

FIG. 1 is a plan view of essential portions showing a state where the casing of an electrically-driven fan in this embodiment 1 is detached, FIG. 2(a) is a sectional view of the essential portions of the electrically-driven fan in this embodiment 1, and FIG. 2(b) is a sectional view of the essential portions taken along line A—A in (a).

Referring to FIG. 1, numeral 1 designates an electrically-driven fan in this embodiment 1, numeral 2 a disc-shaped base portion, numeral 3 suction openings which are formed in the base portion 2, numeral 4 a rotor, numeral 5 a plurality of blowing blades which are radially juxtaposed at the outer peripheral part of the rotor 4, numeral 6 cords for deriving a DC power source as are connected to a substrate to be explained later, and numeral 7 a connector. Here, the electrically-driven fan 1 is a centrifugal fan in which, owing to the rotation of the rotor 4, air is drawn by suction through the suction openings 3 and an opening formed in the upper surface of the casing (not shown), and the air is sent through an air sending port (not shown) formed in the side surface of the casing. The electrically-driven fan 1 cools a CPU or the like disposed in adjacency thereto.

Figure 2:
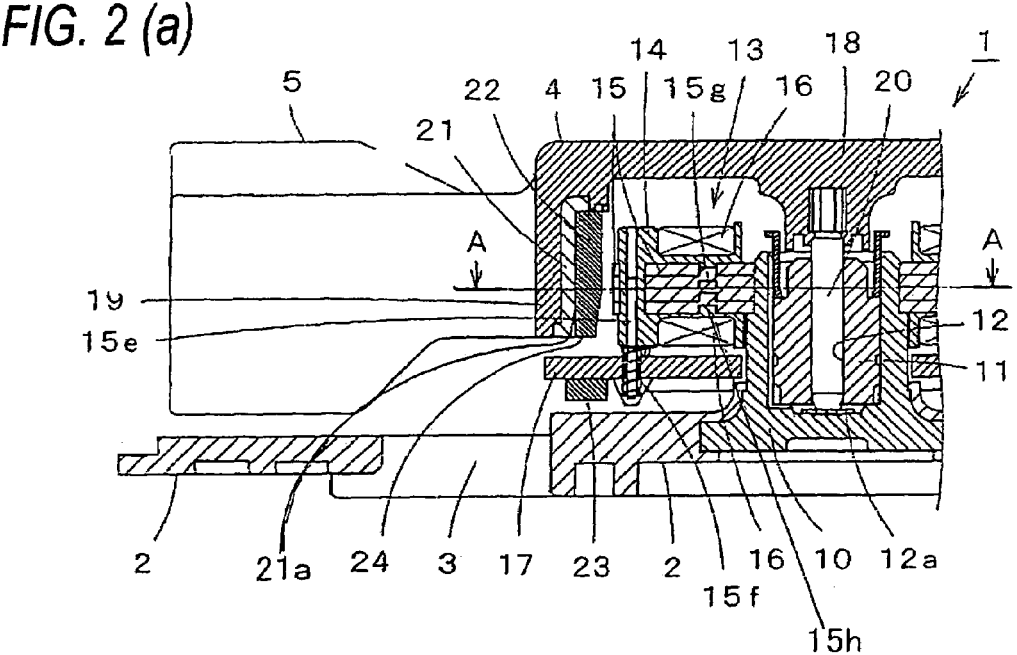
FIG. 2(*a*) is a sectional view of the essential portions of the electrically-driven fan in this embodiment 1, and (b) is a sectional view of the essential portions taken along line A—A in (a).
Figure 2:
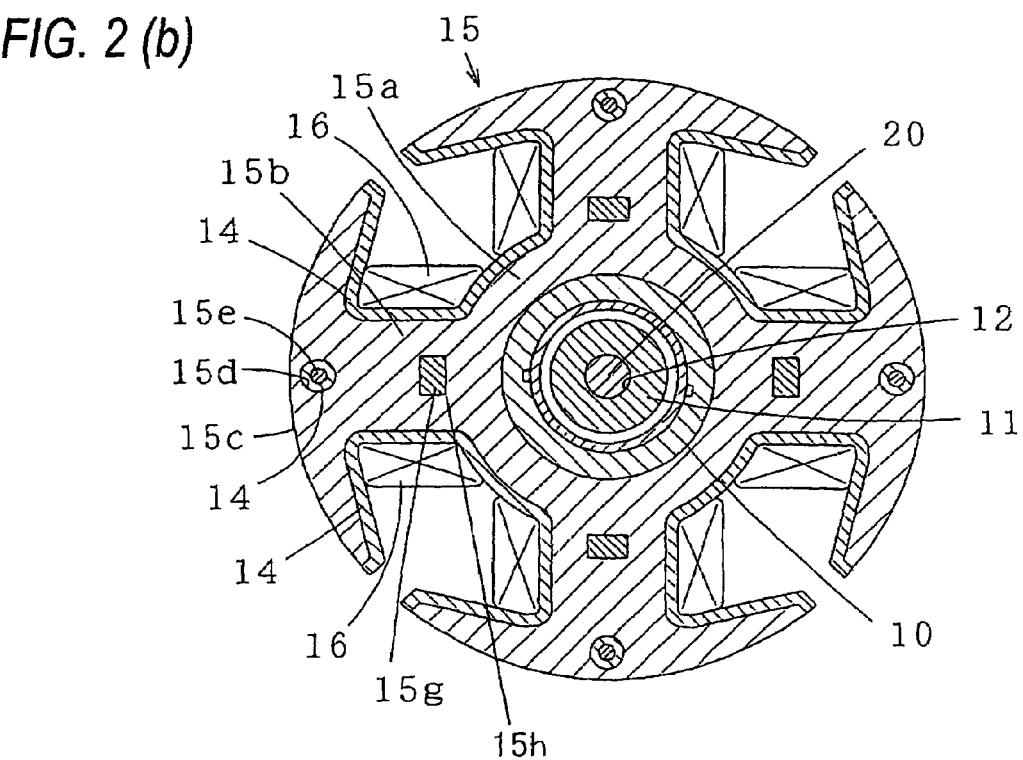

Referring to FIG. 2, numeral 10 designates a boss portion which is disposed centrally of the upper surface of the base portion 2, numeral 11 a bearing portion which is snugly fixed in the hollow part of the boss portion 10, numeral 12 the bearing hole of the bearing portion 11, sign 12*a* a bearing plate which is provided at the bottom of the bearing hole 12, and numeral 13 a plurality of stators which are disposed at equal intervals at the outer peripheral part of the boss portion 10 and which are configured of insulating portions 14, an iron core 15 and coils 16 to be explained below. Numeral 14 designates the insulating portion which is formed of a synthetic resin or the like insulating material, numeral 15 the iron core which is laminated from a plurality of thin plates, numeral 16 the coil which is wound on the iron core 15, numeral 17 the disc-shaped substrate which is disposed under the stators 13 at the outer peripheral part of the boss portion 10, numeral 18 a disc-shaped top portion which constitutes the rotor 4, numeral 19 a cylindrical side portion which constitutes the rotor 4, numeral 20 a rotary shaft which is fixed upright to the center of the lower surface of the top portion 18 of the rotor 4, numeral 21 a cylindrical yoke which is snugly fixed inside the side portion 19 of the rotor 4, sign 21*a* an enlarged-diameter yoke portion which is formed by enlarging the diameter of the lower part of the yoke 21, numeral 22 a cylindrical magnet which is snugly fixed inside the yoke 21, numeral 23 a rotor position detector which is constructed of a Hall element fixed to the lower surface of the substrate 17 underneath the cylindrical magnet 22, and numeral 24 a thin-walled portion in which the effective thickness of one end part of the cylindrical magnet 22 nearer to the rotor position detector 23 is made smaller than that of the other end part.

Besides, as shown in FIGS. 2(*a*) and 2(*b*), the iron core 15 is formed by stacking the thin plates each of which has a ring-shaped portion 15*a* that is annularly fitted on the boss portion 10, a plurality of extension portions 15*b* that are radially extended around the ring-shaped portion 15*a*, and salient pole portions 15*c* that are provided at the distal end parts of the extension portions 15*b*. The outer edge part of each of the salient pole portions 15*c* is formed in the shape of a circular arc which centers round the bearing hole 12. The insulating portions 14 are disposed so as to cover the iron core 15 except the outer edge parts of the salient pole portions 15*c*, and the coils 16 are wound round the extension portions 15*b* of the iron core 15 through the insulating portions 14. Besides, a pin insertion hole 15*d* is provided in the central part of each salient pole portion 15*c* of the iron core 15, and a connection pin 15*e* is inserted through the pin insertion hole 15*d* in a manner to be insulated from the iron core 15 by the insulating portion 14. The lower end part of the connection pin 15*e* is disposed penetrating through the substrate 17, and a lead wire 15*f* at one end part of the winding of the coil 16 is wound round the connection pin 15*e*, thereby to be electrically connected with a circuit portion which is mounted on the lower surface of the substrate 17. Further, convex fitting portions 15*g* are formed at the upper surfaces of the extension portions 15*b* of each of the stacked thin plates of the iron core 15, while concave fitting portions 15*h* are formed at the lower surfaces thereof. Thus, the individual thin plates are coupled in the shape of the lamination with the convex fitting portions 15*g* snugly fitted in the correspondent concave fitting portions 15*h*.

The operation of the electrically-driven fan 1 in this embodiment 1 constructed as stated above will now be described with reference to the drawings.

First, the rotating operation of the rotor 4 will be described.

When the electrically-driven fan 1 is driven in such a way that a control unit (not shown) on the substrate 17 is fed with a direct current through the cords 6 from the substrate of a personal computer to which the connector 7 is connected, currents flow through the coils 16 of the individual stators 13, and magnetic forces are generated in the individual salient pole portions 15*c* of the iron core 15. Besides, the cylindrical magnet 22 is magnetized alternately into N-poles and S-poles in its circumferential direction, so that when the rotor 4 is rotated, the rotor position detector 23 detects the N-poles and S-poles of the cylindrical magnet 22 to generate output signals. The currents flowing through the individual coils 16 are controlled so as to be commutated by the output signals of the rotor position detector 23. Thus, the magnetic poles of the magnetic forces generated in the individual salient poles 15*c* change sequentially, and they attract the N-poles and S-poles of the cylindrical magnet 22, so that the rotor 4 is rotated in a predetermined direction.

Next, there will be described attractive forces which urge the rotor 4 toward the base portion 2.

Figure 3:
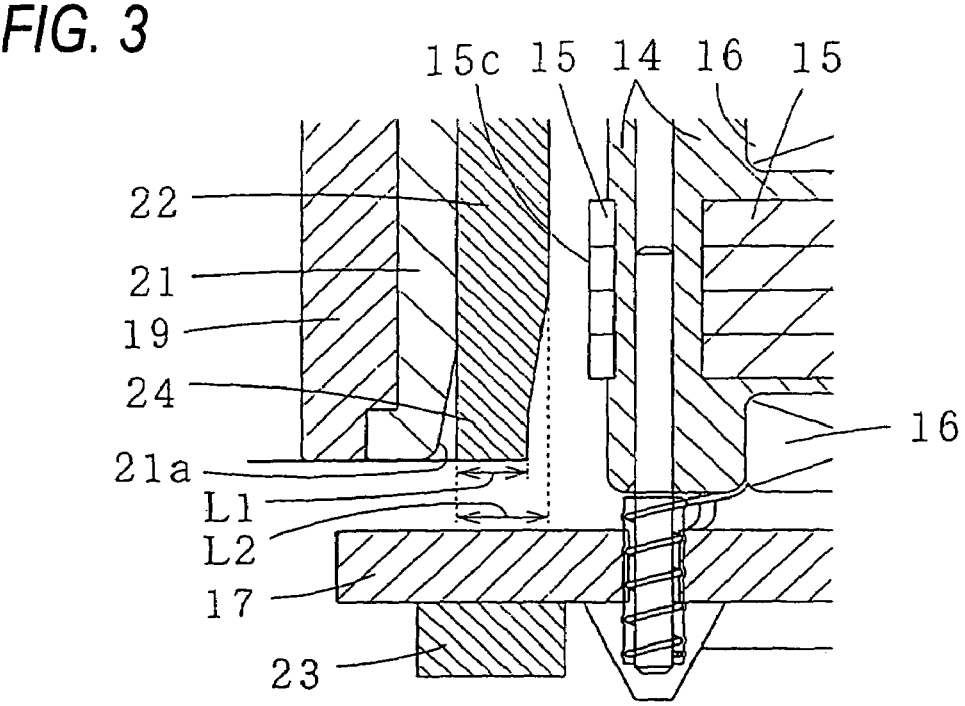
FIG. 3 is an enlarged sectional view of the essential portions of the electrically-driven fan in this embodiment 1.

FIG. 3 is an enlarged sectional view of the essential portions of the electrically-driven fan 1 in this embodiment 1.

As shown in FIG. 3, the thickness L1 of the thin-walled portion 24 on the lower end side of the cylindrical magnet 22 is made smaller than the thickness L2 of the upper end side thereof. Here, magnetic attractive forces are always generated between each salient pole portion 15*c* and the cylindrical magnet 22. The attractive force between the side of the thin-walled portion 24 of the cylindrical magnet 22 and the salient pole portion 15*c* of the iron core 15 becomes relatively smaller than the attractive force between the upper end side of the cylindrical magnet 22 and the salient pole portion 15*c*. Thus, of the magnetic forces which the cylindrical magnet 22 receive from the salient portion 15*c*, the upward magnetic force in the axial direction of the rotary shaft 20 is smaller than in a case where the thin-walled portion 24 is not formed, so that the rotor 4 is urged toward the base portion 2. Accordingly, in a case where the electrically-driven fan 1 is mounted looking down, the rotor 4 can be prevented from rising (moving in a direction in which the rotary shaft 20 comes out).

Here, the effective thickness L1 of the thin-walled portion 24 of the cylindrical magnet 22 is made 50%–90% of the effective thickness L2 of the other end part thereof. As the effective thickness L1 of the thin-walled portion 24 of the cylindrical magnet 22 becomes smaller than 50% of the effective thickness L2 of the other end part, unfavorably the outputs based on the rotor position detector 23 become smaller to lower a detection precision. As the effective thickness L1 becomes larger than 90%, unfavorably the attractive force by which the rotor 4 is attracted onto a side opposite to the base portion 2 becomes larger, and hence, the rotor 4 becomes easier to come away from the base portion 2 due to its weight in the case where the electrically-driven fan 1 is mounted and used looking down.

Incidentally, the thin-walled portion 24 of the cylindrical magnet 22 is not restricted to the shape in which the annular recess is formed in the inner peripheral wall, but any of various shapes can be employed. Different examples of the cylindrical magnet 22 will be described with reference to FIG. 4.

FIG. 4(a) is a sectional view of essential portions showing another example of the cylindrical magnet of the electrically-driven fan 1 in this embodiment 1, while FIG. 4(b) is a sectional view of essential portions showing another example of the cylindrical magnet of the electrically-driven fan 1 in this embodiment 1.

Figure 4:
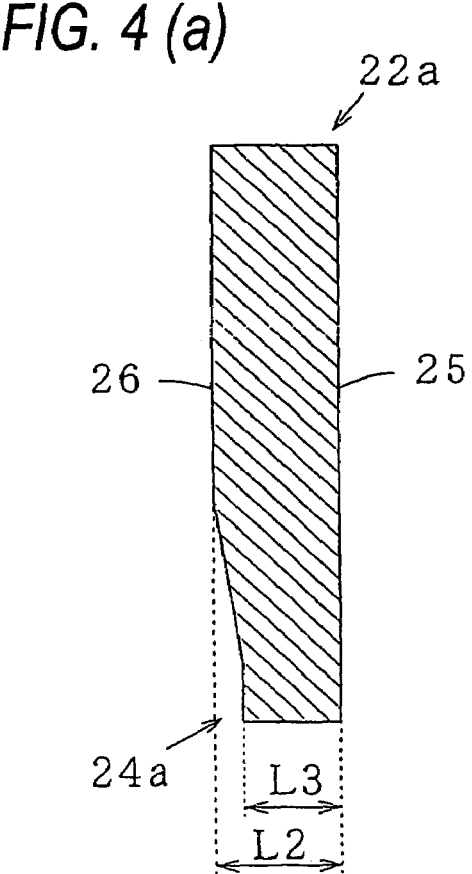
FIG. 4(*a*) is a sectional view of essential portions showing another example of the cylindrical magnet of the electrically-driven fan in this embodiment 1, and FIG. 4(*b*) is a sectional view of essential portions showing another example of the cylindrical magnet of the electrically-driven fan in this embodiment 1.
Figure 4:
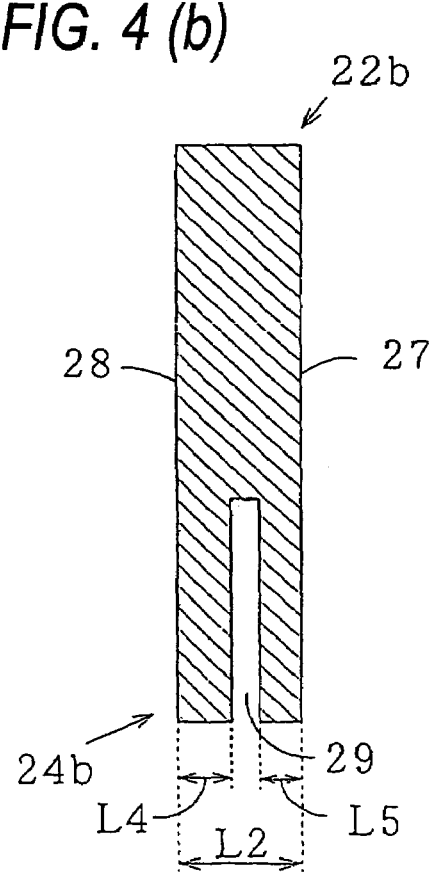

Referring to FIG. 4, signs 22a and 22b designate the cylindrical magnets, signs 24a and 24b the thin-walled portions of the respective cylindrical magnets 22a and 22b, numerals 25 and 26 the inner peripheral wall and outer peripheral wall of the cylindrical magnet 22a, respectively, and numerals 27 and 28 the inner peripheral wall and outer peripheral wall of the cylindrical magnet 22b, respectively.

As shown in FIG. 4(a), it is also possible to employ the cylindrical magnet 22a which has the thin-walled portion 24a formed with an annular recess on the side of the outer peripheral wall 26. Besides, as shown in FIG. 4(b), it is also possible to employ a structure in the shape of a double cylinder in which a hollow part 29 is formed for the thin-walled portion 24b. Here, the effective thickness of the thin-walled portion 24a is L3, and the effective thickness of the thin-walled portion 24b which has the hollow part 29 therein is L4+L5.

Next, the rises of respective rotors during rotations were compared using the electrically-driven fan in this embodiment 1 and an electrically-driven fan in the prior art.

Figure 5:
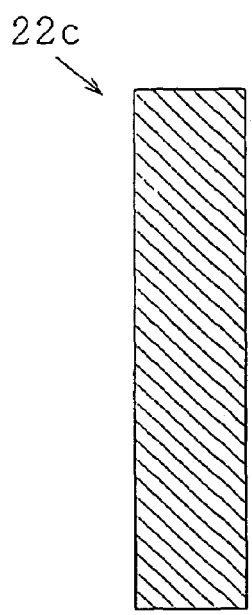
FIG. 5(*a*) is a sectional view of the essential portion of the cylindrical magnet of an electrically-driven fan in the prior art, FIG. 5(*b*) is an enlarged sectional view of the essential portions of the bearing portion and rotary shaft of the electrically-driven fan mounted looking down, and FIG. 5(*c*) is a graph showing the relationships between the upward movement lengths of the rotary shafts and the weights of the rotors of the electrically-driven fan in this embodiment 1 and the electrically-driven fan in the prior art.
Figure 5:
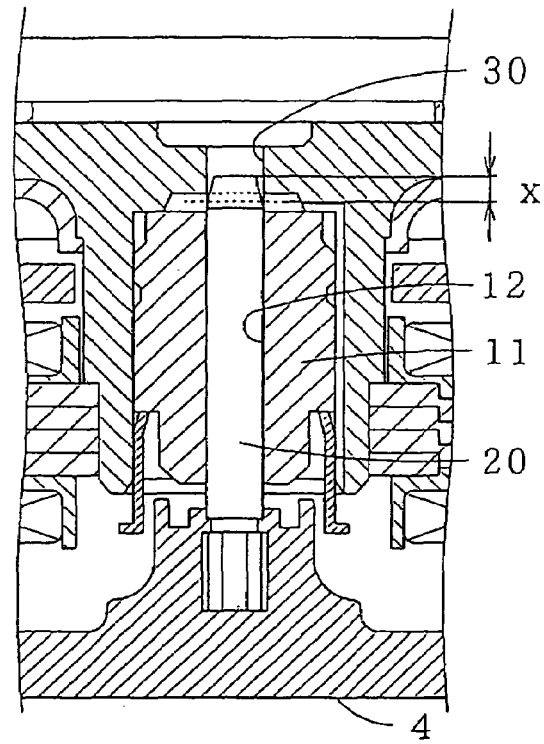
Figure 5:
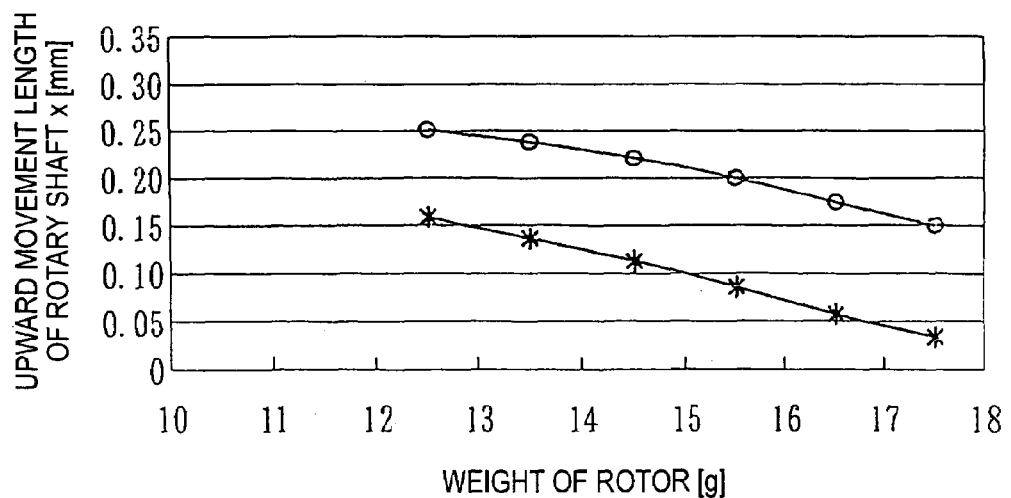

FIG. 5(a) is a sectional view of the essential portion of the cylindrical magnet of the electrically-driven fan in the prior art, FIG. 5(b) is an enlarged sectional view of the essential portions of the bearing portion and rotary shaft of the electrically-driven fan mounted looking down, and FIG. 5(c) is a graph showing the relationships between the upward movement lengths of the rotary shafts and the weights of the rotors of the electrically-driven fan in this embodiment 1 and the electrically-driven fan in the prior art.

As shown in FIG. 5(a), the electrically-driven fan in the prior art had the same construction as that of the electrically-driven fan in Embodiment 1 except the point that the cylindrical magnet 22c did not include the thin-walled portion 24.

Besides, as shown in FIG. 5(b), each of the electrically-driven fan 1 in Embodiment 1 and the electrically-driven fan in the prior art as were used was not provided with the bearing plate 12a at the bottom of the bearing hole 12, and was further formed with a penetrating hole 30 on the bottom side of the bearing hole 12 (upper side in FIG. 5(b)) so as not to mechanically hinder the movement of the rotary shaft 20 in a vertical direction.

Besides, both the electrically-driven fans were mounted looking down, and the weights of the rotors were changed at intervals of 1 gram between 12.5 grams and 17.5 grams. Under these conditions, the upward movement lengths x of the rotary shafts 20 in states where the rotors 4 were rotated were measured. The results of the measurements are shown in FIG. 5(c). In FIG. 5(c), marks ○ indicate the measured results of the electrically-driven fan in this embodiment 1, and marks * indicate the measured results of the electrically-driven fan in the prior art. Incidentally, the reference position of the movement lengths was set at the lower surface of the bearing plate 12a in Embodiment 1.

It has been revealed that, as shown in FIG. 5(c), the electrically-driven fan in this embodiment 1 as is formed with the thin-walled portion 24 in the cylindrical magnet 22 exhibit the upward movement lengths x which are about 0.1 mm larger than in the prior-art fan not formed with the thin-walled portion 24. Here, when the upward movement length x becomes less than zero, the rise of the rotor 4 appears. With the electrically-driven fan in the prior art, when the weight of the rotor 4 is made larger than 17.5 grams, the rise of the rotor 4 may highly possibly appear, whereas with the electrically-driven fan in this embodiment 1, there is room for enlarging the weight of the rotor 4. It has been revealed that the rise does not appear in this embodiment 1 even when the weight of the rotor 4 is increased about 4–5 grams more than in the prior art.

Since the electrically-driven fan 1 in this embodiment 1 is constructed as described above, it has functions as stated below.

(1) Since one end part of a cylindrical magnet 22 near to a rotor position detector 23 includes a thin-walled portion 24 whose effective thickness L1 is made smaller than the effective thickness L2 of the other end part on the opposite side, an attractive force by which each salient pole portion 15c of an iron core 15 and the thin-walled portion 24 draw each other magnetically becomes smaller as compared with an attractive force by which the salient pole portion 15c and the other end part draw each other, and an attractive force by which a rotor 4 is drawn toward the side of a base portion 2 enlarges, so that even when an electrically-driven fan 1 is mounted looking down, the rotor 4 can be prevented from coming away from the base portion 2 due to its weight. Thus, a rotary shaft 20 can be prevented from abnormally touching the inner peripheral wall of a bearing hole 12 and then shortening a lifetime or from giving forth noise, so that blowing blades 5 can be enlarged to enhance a coolability.

(2) Since the thin-walled portion 24 is formed merely by decreasing the effective thickness L1, the width of the gap between the cylindrical magnet 22 and the rotor position detector 23 does not enlarge, and the lowering of a detection precision based on the rotor position detector 23 can be suppressed.

(3) Since the end part of a yoke 21 near to the rotor position detector 23 includes an enlarged-diameter yoke portion 21a which is expanded toward the outer peripheral side of the yoke, the cylindrical magnet 22 can be easily fitted into the inside diameter side of the yoke 21, and the assemblage can be performed with ease.

Embodiment 2

Figure 6:
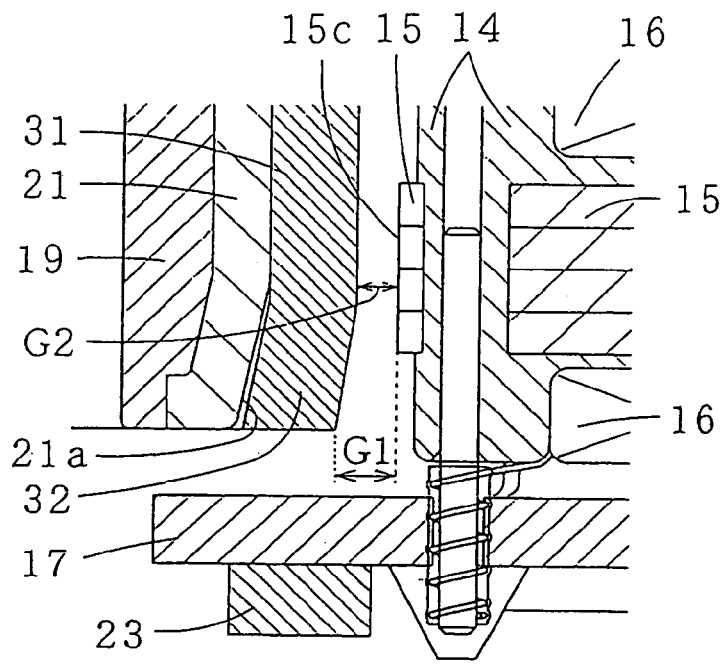
FIG. 6(*a*) is an enlarged sectional view of the essential portions of an electrically-driven fan in Embodiment 2.
Figure 6:
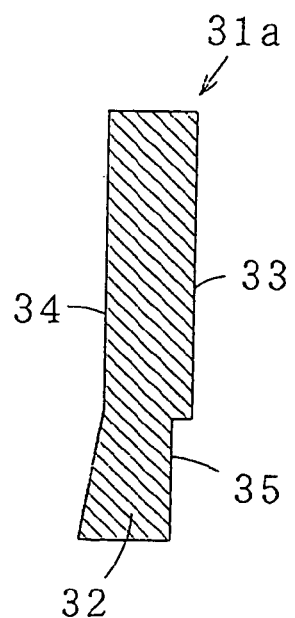

FIG. 6(a) is an enlarged sectional view of the essential portions of an electrically-driven fan 1 in Embodiment 2, while FIG. 6(b) is a sectional view of an essential portion showing another example of the cylindrical magnet of the electrically-driven fan in this embodiment 2.

Referring to FIG. 6(a), numeral 31 designates a cylindrical magnet in which the width G1 of the gap between the inwall of the cylindrical magnet at one end part thereof near to a rotor position detector 23 and the outer peripheral part of each stator 13 is made larger than the width G2 of the gap between the inwall at the other end part and the outer peripheral part of the stator 13.

FIG. 6(b) shows the other example in this embodiment 2. Numeral 32 designates an enlarged-diameter magnet portion which is formed at one end part of the cylindrical magnet 31 near to the rotor position detector 23, sign 31a the cylindrical magnet whose lower end part is formed with the enlarged-diameter magnet portion 32, numeral 33 the inner peripheral wall of the cylindrical magnet 31 a, numeral 34 the outer peripheral wall of the cylindrical magnet 31a, and numeral 35 a magnet cutout which is formed in the inner peripheral wall 33 of the cylindrical magnet 31a at the lower end part thereof. Incidentally, parts described in Embodiment 1 are indicated by the same reference numerals and signs, which shall be omitted from description.

A point at which the electrically-driven fan in this embodiment 2 constructed as described above differs from Embodiment 1, is that an enlarged-diameter magnet portion 32 is formed at one end part of the cylindrical magnet 31 near to the rotor position detector 23.

Here, the width G1 of the gap between the inwall of the enlarged-diameter magnet portion 32 of the cylindrical magnet 31 and the outer peripheral part of each salient pole portion 15c is made 10%–30% larger than the width G2 of the gap between the inwall of the other end part and the outer peripheral part of the salient pole portion 15c. As the width G1 of the gap becomes larger than the width G2 of the gap in an amount less than 10%, unfavorably an attractive force by which a rotor 4 is drawn onto a side opposite to a base portion 2 becomes larger, and hence, the rotor 4 becomes easier to come away from the base portion 2 due to its weight in a case where the electrically-driven fan 1 is mounted and used looking down. As the width G1 becomes larger than the width G2 in excess of 30%, unfavorably outputs based on the rotor position detector 23 become smaller to lower a detection precision.

Incidentally, the enlarged-diameter magnet portion 32 of the cylindrical magnet 31 is not restricted to the shape specified above, but any of various shapes can be employed. The different example of the cylindrical magnet will be described with reference to FIG. 6(b).

As shown in FIG. 6(b), the magnet cutout 35 can also be formed in the inner peripheral wall 33 of the enlarged-diameter magnet portion 32 of the cylindrical magnet 31a.

Since the electrically-driven fan in this embodiment 2 is constructed as thus far described, it has functions as stated below, in addition to the functions of Embodiment 1.

(1) Since the width G1 of the gap between the inwall of the enlarged-diameter magnet portion 32 of the cylindrical magnet 31 near to the rotor position detector 23 and the outer peripheral part of each salient pole portion 15c of an iron core 15 is made larger than the width G2 of the gap between the inwall of the other end part of the cylindrical magnet and the outer peripheral part of the salient pole portion 15c, an attractive force by which the salient pole portion 15c and the enlarged-diameter magnet portion 32 draw each other becomes smaller as compared with an attractive force by which the salient pole portion 15c and the other end part draw each other, and an attractive force by which the rotor 4 is drawn toward the side of the base portion 2 enlarges, so that even when the electrically-driven fan 1 is mounted and used looking down, the rotor 4 can be prevented from coming away from the base portion 2 due to its weight. Thus, a rotary shaft 20 can be prevented from abnormally touching the inner peripheral wall of a bearing hole 12 and then shortening a lifetime or from giving forth noise, so that blowing blades 5 can be enlarged to enhance a coolability.

(2) Since the width G1 of the gap between the inwall of the enlarged-diameter magnet portion 32 of the cylindrical magnet 31 and the outer peripheral part of each salient pole portion 15c is merely made larger, the width of the gap between the cylindrical magnet 31 and the rotor position detector 23 does not enlarge, and the thickness of the cylindrical magnet 31 does not change, either, so that the lowering of a detection precision based on the rotor position detector 23 is preventable.

Embodiment 3

Figure 7:
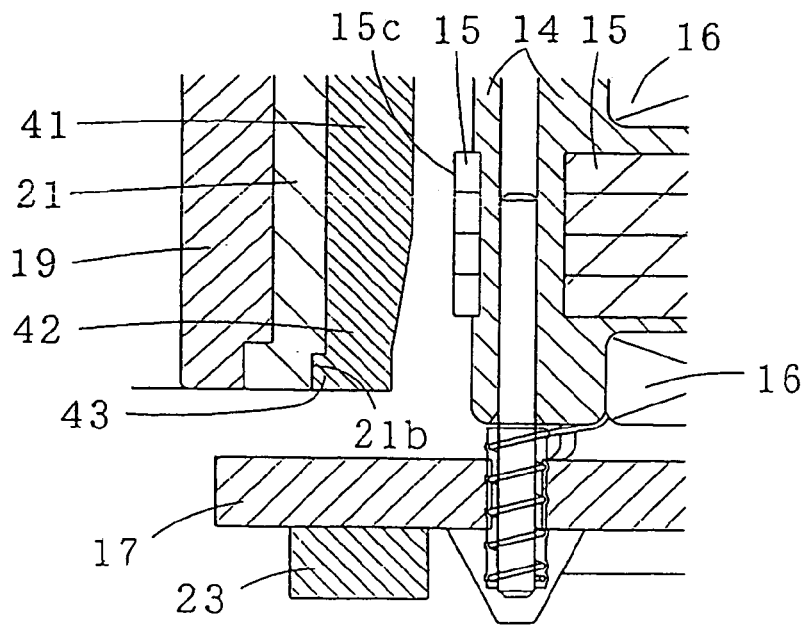
FIG. 7 is an enlarged sectional view of the essential portions of an electrically-driven fan in Embodiment 3.

FIG. 7 is an enlarged sectional view of the essential portions of an electrically-driven fan in Embodiment 3.

Referring to FIG. 7, sign 21b designates an annular yoke cutout which is formed in the inner peripheral wall of a yoke 21 at the lower end part thereof, numeral 41 a cylindrical magnet, numeral 42 a thin-walled portion which is formed at one end part of the cylindrical magnet 41 near to a rotor position detector 23, and numeral 43 an annular lug which is formed on the outer peripheral wall side of the thin-walled portion 42. Incidentally, the same parts as described in Embodiment 1 are indicated by the same reference numerals and signs, which shall be omitted from description.

Points at which the electrically-driven fan in this embodiment 3 constructed as described above differs from Embodiment 1, are that the lug 43 is formed on the outer peripheral wall side of the cylindrical magnet 41 at one end part thereof near to the rotor position detector 23, and that the yoke cutout 21b is formed in the inner peripheral wall of the yoke 21 at the lower end part thereof near to the rotor position detector 23. Owing to the constructional differences, the electrically-driven fan in this embodiment 3 has functions as stated below, in addition to the functions of Embodiment 1.

(1) Since the cylindrical magnet 41 includes the annular lug 43 on the outer peripheral wall side of the thin-walled portion 42, the lowering of a detection precision based on the rotor position detector 23 is preventable, and the lug 43 can be received in the yoke cutout 21b of the yoke 21.

The present invention relates to an electrically-driven fan for forcibly cooling the CPU of a personal computer, or the like. Especially, according to the invention, it is possible to provide an electrically-driven fan in which, even when the fan is mounted and used looking down, a rotor does not move vertically downwards due to its weight, and a rotary shaft can be prevented from abnormally touching the inner peripheral wall of a bearing hole and then shortening a lifetime, so that blowing blades can be enlarged to enhance a coolability, and in which the lowering of a detection precision based on a rotor position detector can be suppressed on that occasion.

This application is based upon and claims the benefit of priority of Japanese Patent Application No 2004-027649 filed on Apr. 2, 2004, the contents of which are incorporated herein by reference in its entirety.

What is claimed is:

1. A motor comprising:
   a base portion;
   a bearing portion, which is provided on the base portion;
   a stator, which is disposed around the bearing portion;
   a rotary shaft, which is journaled in the bearing portion; and
   a magnet, which is disposed in opposition to an outer peripheral part of the stator, and which rotates integrally with the rotary shaft, wherein:
   a magnetic force of the magnet on one end side thereof is weaker than a magnetic force of the magnet on the other end side thereof, in an axial direction of the rotary shaft,
   the one end side of the magnet in the axial direction of the rotary shaft includes a thin-walled portion whose effective thickness is made smaller than an effective thickness of the magnet on the other end side thereof, and
   the effective thickness of the thin-walled portion of the magnet on the one end side thereof is made 50%–90% of the effective thickness of the magnet on the other end side thereof.

2. A motor comprising:
a base portion;
a bearing portion, which is provided on the base portion;
a stator, which is disposed around the bearing portion;
a rotary shaft, which is journaled in the bearing portion; and
a magnet, which is disposed in opposition to an outer peripheral part of the stator, and which rotates integrally with the rotary shaft, wherein:
a magnetic force of the magnet on one end side thereof is weaker than a magnetic force of the magnet on the other end side thereof, in an axial direction of the rotary shaft,
a width of a gap between an inwall of the magnet on the one end side thereof and the outer peripheral part of the stator, in the axial direction of the rotary shaft, is made larger than a width of a gap between an inwall of the magnet on the other end side thereof and the outer peripheral part of the stator, and
the width of the gap between the inwall of the magnet on the one end side thereof and the outer peripheral part of the stator is made 10%–30% larger than the width of the gap between the inwall of the magnet on the other end side thereof and the outer peripheral part of the stator.

3. An electrically-driven fan comprising:
a base portion;
a bearing portion which is provided on the base portion;
a stator which includes a plurality of cores that are disposed around the bearing portion, and coils that are wound on the respective cores;
a rotor which includes a rotary shaft that is journaled in the bearing portion, and a magnet that is formed centering round the rotary shaft, that is disposed in opposition to an outer peripheral part of the stator, and that rotates integrally with the rotary shaft;
a plurality of blowing blades which are radially juxtaposed on an outer peripheral part of the rotor; and
a rotor position detector which is disposed on a side of the magnet near to the base portion, with a gap of predetermined width relative to the magnet;
wherein the magnet includes a thin-walled portion on one end side of the magnet in an axial direction of the rotor, the thin-walled portion having an effective thickness which is smaller than an effective thickness of the magnet on the other end side thereof.

4. The electrically-driven fan according to claim 3, wherein a width of a gap between an inwall of the magnet on the one end side thereof and the outer peripheral part of the stator, in an axial direction of the rotary shaft, is made larger than a width of a gap between an inwall of the magnet on the other end side thereof and the outer peripheral part of the stator.

5. The electrically-driven fan according to claim 3, wherein the magnet includes a lug which is provided on at least one of an inwall and an outer wall of the magnet at an end part thereof near to the rotor position detector.

6. The electrically-driven fan according to claim 3, further comprising:
a cylindrical yoke, which is fitted outside the magnet;
wherein the yoke includes either of an enlarged-diameter yoke portion which is expanded toward an outer peripheral side of the yoke, and a yoke cutout which is annularly provided in an inwall of the yoke, at an end part of the yoke near to the rotor position detector.

7. An electrically-driven fan comprising:
a base portion;
a bearing portion, which is provided on the base portion;
a stator, which includes a plurality of iron cores that are disposed around the bearing portion, and coils that are wound on the respective iron cores;
a rotor, which includes a rotary shaft that is journaled in the bearing portion, and a cylindrical magnet that is formed in a shape of a cylinder centering round the rotary shaft, that is disposed in opposition to an outer peripheral part of the stator, and that rotates integrally with the rotary shaft;
a plurality of blowing blades which are radially juxtaposed on an outer peripheral part of the rotor; and
a rotor position detector which is disposed on a side of the cylindrical magnet near to the base portion, with a gap of predetermined width relative to the cylindrical magnet; wherein
the cylindrical magnet includes a thin-walled portion at one end part of the cylindrical magnet near to the rotor position detector, the thin-walled portion having an effective thickness which is smaller than an effective thickness of the cylindrical magnet at the other part thereof.

8. The electrically-driven fan according to claim 7, wherein the effective thickness of the thin-walled portion of the cylindrical magnet is made 50%–90% of the effective thickness of the cylindrical magnet at the other end part thereof.

9. An electrically-driven fan comprising:
a base portion;
a bearing portion which is erected on the base portion;
a stator which includes a plurality of iron cores that are disposed around the bearing portion, and coils that are wound on the respective iron cores;
a rotor which includes a rotary shaft that is journaled in the bearing portion, and a cylindrical magnet that is formed in a shape of a cylinder centering round the rotary shaft, that is disposed in opposition to an outer peripheral part of the stator, and that rotates integrally with the rotary shaft;
a plurality of blowing blades which are radially juxtaposed on an outer peripheral part of the rotor; and
a rotor position detector which is disposed on a side of the cylindrical magnet near to the base portion, with a gap of predetermined width relative to the cylindrical magnet; wherein
a width of a gap between an inwall of the cylindrical magnet at one end part thereof near to the rotor position detector and the outer peripheral part of the stator is made larger than a width of a gap between an inwall of the cylindrical magnet at other end part thereof and the outer peripheral part of the stator.

10. The electrically-driven fan according to claim 9, wherein the width of the gap between the inwall of the cylindrical magnet at the one end part thereof near to the rotor position detector and the outer peripheral part of the stator is made 10%–30% larger than the width of the gap between the inwall of the cylindrical magnet at the other end part thereof and the outer peripheral part of the stator.

11. The electrically-driven fan according to claim 7, wherein the cylindrical magnet includes an annular lug which is provided on at least one of an inwall and an outer wall of the cylindrical magnet at the end part thereof near to the rotor position detector.

12. The electrically-driven fan according to claim 7, further comprising:
a cylindrical yoke, which is fitted outside the cylindrical magnet, wherein the yoke includes either of an enlarged-diameter yoke portion which is expanded toward an outer peripheral side of the yoke, and a yoke cutout which is annularly provided in an inwall of the yoke, at an end part of the yoke near to the rotor position detector.

13. The electrically-driven fan according to claim 4, wherein the magnet includes a lug which is provided on at least one of an inwall and an outer wall of the magnet at an end part thereof near to the rotor position detector.

14. The electrically-driven fan according to claim 4, further comprising:
a cylindrical yoke, which is fitted outside the magnet; wherein
the yoke includes either of an enlarged-diameter yoke portion which is expanded toward an outer peripheral side of the yoke, and a yoke cutout which is annularly provided in an inwall of the yoke, at an end part of the yoke near to the rotor position detector.

15. The electrically-driven fan according to claim 5, further comprising:
a cylindrical yoke, which is fitted outside the magnet; wherein
the yoke includes either of an enlarged-diameter yoke portion which is expanded toward an outer peripheral side of the yoke, and a yoke cutout which is annularly provided in an inwall of the yoke, at an end part of the yoke near to the rotor position detector.

16. The electrically-driven fan according to claim 13, further comprising:
a cylindrical yoke, which is fitted outside the magnet; wherein
the yoke includes either of an enlarged-diameter yoke portion which is expanded toward an outer peripheral side of the yoke, and a yoke cutout which is annularly provided in an inwall of the yoke, at an end part of the yoke near to the rotor position detector.

17. The electrically-driven fan according to claim 8, wherein the cylindrical magnet includes an annular lug which is provided on at least one of an inwall and an outer wall of the cylindrical magnet at the end part thereof near to the rotor position detector.

18. The electrically-driven fan according to claim 9, wherein the cylindrical magnet includes an annular lug which is provided on at least one of an inwall and an outer wall of the cylindrical magnet at the end part thereof near to the rotor position detector.

19. The electrically-driven fan according to claim 10, wherein the cylindrical magnet includes an annular lug which is provided on at least one of an inwall and an outer wall of the cylindrical magnet at the end part thereof near to the rotor position detector.

20. The electrically-driven fan according to claim 8, further comprising:
a cylindrical yoke, which is fitted outside the cylindrical magnet, wherein the yoke includes either of an enlarged-diameter yoke portion which is expanded toward an outer peripheral side of the yoke, and a yoke cutout which is annularly provided in an inwall of the yoke, at an end part of the yoke near to the rotor position detector.

21. The electrically-driven fan according to claim 9 further comprising:
a cylindrical yoke, which is fitted outside the cylindrical magnet, wherein the yoke includes either of an enlarged-diameter yoke portion which is expanded toward an outer peripheral side of the yoke, and a yoke cutout which is annularly provided in an inwall of the yoke, at an end part of the yoke near to the rotor position detector.

22. The electrically-driven fan according to claim 10, further comprising:
a cylindrical yoke, which is fitted outside the cylindrical magnet, wherein the yoke includes either of an enlarged-diameter yoke portion which is expanded toward an outer peripheral side of the yoke, and a yoke cutout which is annularly provided in an inwall of the yoke, at an end part of the yoke near to the rotor position detector.

23. The electrically-driven fan according to claim 11, further comprising:
a cylindrical yoke, which is fitted outside the cylindrical magnet, wherein the yoke includes either of an enlarged-diameter yoke portion which is expanded toward an outer peripheral side of the yoke, and a yoke cutout which is annularly provided in an inwall of the yoke, at an end part of the yoke near to the rotor position detector.

24. The electrically-driven fan according to claim 17, further comprising:
a cylindrical yoke, which is fitted outside the cylindrical magnet, wherein the yoke includes either of an enlarged-diameter yoke portion which is expanded toward an outer peripheral side of the yoke, and a yoke cutout which is annularly provided in an inwall of the yoke, at an end part of the yoke near to the rotor position detector.

25. The electrically-driven fan according to claim 18, further comprising:
a cylindrical yoke, which is fitted outside the cylindrical magnet, wherein the yoke includes either of an enlarged-diameter yoke portion which is expanded toward an outer peripheral side of the yoke, and a yoke cutout which is annularly provided in an inwall of the yoke, at an end part of the yoke near to the rotor position detector.

26. The electrically-driven fan according to claim 19, further comprising:
a cylindrical yoke, which is fitted outside the cylindrical magnet, wherein the yoke includes either of an enlarged-diameter yoke portion which is expanded toward an outer peripheral side of the yoke, and a yoke cutout which is annularly provided in an inwall of the yoke, at an end part of the yoke near to the rotor position detector.

* * * * *